(12) United States Patent
Yoshida et al.

(10) Patent No.: US 6,388,759 B1
(45) Date of Patent: May 14, 2002

(54) IMAGE FORMING APPARATUS CAPABLE OF PROPERLY INHIBITING AUTOMATIC PRINTING

(75) Inventors: Akinori Yoshida, Nishio; Hiroaki Ikeda, Toyokawa; Motomi Takemoto, Toyokawa; Tomokazu Kato, Toyokawa, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/189,764

(22) Filed: Nov. 10, 1998

(30) Foreign Application Priority Data

Nov. 11, 1997 (JP) ............................................... 9-308754

(51) Int. Cl.⁷ ............................................... G06K 15/02
(52) U.S. Cl. ...................... 358/1.13; 358/1.1; 358/1.15; 347/5; 347/23; 399/85; 399/82
(58) Field of Search ......................... 358/1.1, 1.2, 1.4, 358/1.8, 1.13, 1.14, 1.15; 347/5, 14, 23; 399/50, 51, 66, 67, 68, 76, 85, 87, 82

(56) References Cited

U.S. PATENT DOCUMENTS 5,546,166 A  8/1996  Hirota et al.
6,176,564 B1 * 1/2001 Katayama ..................... 347/23

FOREIGN PATENT DOCUMENTS

| JP | 04153669 | 5/1992 |
| JP | 04307567 | 10/1992 |
| JP | 05204215 | 8/1993 |
| JP | 06105046 | 4/1994 |
| JP | 06178037 | 6/1994 |
| JP | 07038685 | 7/1995 |

* cited by examiner

*Primary Examiner*—Mark Wallerson
(74) *Attorney, Agent, or Firm*—McDermott, Will & Emery

(57) ABSTRACT

There is provided an image forming apparatus that has an auto-print function for once storing data received externally into a memory and thereafter automatically printing out the data and is able to properly inhibit the auto-print. The apparatus is provided with non-manipulation process executing units for executing another process by putting an operation input unit or a print unit inoperable or inexecutable for a specified time regardless of operation of the operation input unit. The apparatus is further provided with an inhibition unit capable of inhibiting the execution of processing by the non-manipulation process executing units for an arbitrary inhibition time and a changing unit for changing the inhibition time according to the operation state of the operation input unit and the operation state of the present apparatus.

15 Claims, 10 Drawing Sheets

IMAGE FORMING APPARATUS CAPABLE OF PROPERLY INHIBITING AUTOMATIC PRINTING

This application is based on an application No. 9-308754 filed in Japan, the contents of which are hereby incorporated by reference.

BACKGROUND OF THE INVENTION

The present invention relates to image forming apparatuses. First, the present invention relates more particularly to an apparatus which has an auto-print (automatic printing) function for once storing data received from the outside into a memory and thereafter automatically printing out the data as well as a function for inhibiting the auto-print until a specified time elapses from the time when the operator operates an operation panel. Secondly, the present invention relates to an image forming apparatus having an auto-clear (automatic clearing) function for automatically setting the operation mode back to the initial mode when no operation is executed for a specified time after the completion of a print operation or after the last execution of a certain operation.

In regard to a digital copying machine having a facsimile function, a printer function and so on, there is a number of machines into which the auto-print function for once storing data received from the outside into a memory and thereafter automatically printing out the data is incorporated. Such a copying machine is normally provided with only one printer, and accordingly, there is a proposed apparatus provided with a function for inhibiting the auto-print until a specified time elapses after the operator operates the operation panel so that this auto-print function does not hinder the operator's operation.

However, the prior art digital copying machine of this type only inhibits the auto-print for a specified time after the operator executes an operation. Therefore, if the operator tries, after setting a copy mode with the operation panel and starting copying, to continuously execute copying after a lapse of the inhibition time before the completion of the copying, then there is the problem that the auto-print disadvantageously starts (the operator's operation is hindered). There is also a proposed digital copying machine that inhibits auto-print for a specified time after the completion of a copy operation similar to the occurrence of a panel operation. However, if such an arrangement is adopted, then there is the problem that the auto-print inhibition time is unnecessarily continued to cause the accumulation of print jobs.

In regard to the method of using the copying machine, there is practically a strong possibility that the copying will be executed in the initial mode (standard mode). Accordingly, there has conventionally been widely popularized a copying machine that has an auto-clear function for automatically setting the operation mode back to the initial mode when no operation is executed for a specified time after the completion of the copying or after the last execution of a certain operation.

However, in the copying machine of this type, the auto-clear function operates after a lapse of the specified time. Therefore, if the operator is setting a complicated mode consuming much time while, for example, reading the instruction manual or the like, then the auto-clear function operates on the way to the setting, and this leads to the disadvantage that the mode that has been set is cleared (the operator's operation is hindered).

There are also proposed copying machines as exemplified by a machine that reduces the auto-clear operating time in the time period in which the copying machine is frequently used and increases the auto-clear operating time in the time period in which the copying machine is infrequently used, a machine that automatically sets the auto-clear operating time depending on the key operating speed and a machine that obtains an average time from the time of the completion of copying to the next key operation and changes the auto-clear operating time with reference to the average time. However, the operation mode is prevented from returning to the standard mode for a long time after the completion of the copying, and this leads to the problem that the next operator inadvertently makes a copy in an unintended copy mode (failed copy).

If the operation mode is immediately set back to the initial mode after the completion of the copying, then the same setting operation is to be executed every time of copying when continuously executing copying in the same mode, resulting in a degraded operability.

SUMMARY OF THE INVENTION

The first object of the present invention is to provide an image forming apparatus that has an auto-print function for once storing data received from the outside into a memory and thereafter automatically printing out the data and is able to properly inhibit the auto-print.

Also, the second object of the present invention is to provide an image forming apparatus that has an auto-clear function for automatically setting the operation mode back to the initial mode when no operation is executed for a specified time and is able to properly execute the auto-clear function.

In order to achieve the above first object, the present invention provides an image forming apparatus provided with a printing means, comprising:

an operating means for setting an operation mode and issuing instructions of printing based on a set operation mode;

an image reading means for reading an original image to obtain image data;

a print control means for printing by the printing means the image data according to the instructions of the operating means;

a non-manipulation process executing means for executing a specified process regardless of the operation of the operating means;

an inhibiting means for inhibiting the execution of the process by the non-manipulation process executing means for an inhibition time; and a changing means for changing the inhibition time according to an operation state of the operating means and an operation state of the apparatus.

According to the present image forming apparatus, the changing means changes the inhibition time of the non-manipulation process executing means (referred to as a "non-manipulation process inhibition time") according to the state of operation of the operating means and the state of operation of the present apparatus. Therefore, the execution of a process such as auto-print (referred to as a "non-manipulation process") by the non-manipulation process executing means is properly inhibited. That is, this arrangement can effectively prevent the occurrence of a state in which the non-manipulation process is disadvantageously started since the non-manipulation process inhibition time has already been elapsed when the operator tries to operate the operating means. Therefore, the operator's operation is not hindered. Furthermore, the inhibition of the execution of the non-manipulation process is not unnecessarily continued in the case where the operator does not execute copying by the operating means. Therefore, the non-manipulation process does not accumulate.

In one embodiment, the changing means sets the inhibition time after the end of the operation of the operating means longer than the inhibition time after the end of the print operation of the printing means.

In using this kind of image forming apparatus, there is practically a strong possibility that the operating means will be operated (to issue instructions for executing the print operation or the like) after the operation of the operating means and there is a weak possibility that the operating means will be operated after the end of the print operation by the printing means. Therefore, in this image forming apparatus, the changing means sets the non-manipulation process inhibition time after the operation of the operating means longer than the non-manipulation process inhibition time after the end of the print operation of the printing means. With this arrangement, the execution of the non-manipulation process is inhibited for a relatively long time when there is a strong possibility that the operating means will be operated. On the other hand, the execution of the non-manipulation process is enabled in a relatively short time when there is a weak possibility that the operating means will be operated.

An image forming apparatus of one embodiment further comprises an automatic document feeder unit for successively conveying original sheets in a stack set on an original tray to a read position, the changing means setting the inhibition time after the end of the print operation when the original is manually set longer than the inhibition time after the end of the print operation when the original is set by the automatic document feeder unit.

In using this kind of image forming apparatus, there is practically a strong possibility that the operating means will be operated after the end of the print operation by the printing means when the original is manually set in the original read position and there is a weak possibility that the operating means will be operated after the end of the print operation by the printing means when the original is automatically set in the original read position by the automatic document feeder unit. Therefore, in this image forming apparatus, the changing means sets the non-manipulation process inhibition time after the end of the print operation by the printing means when the original is manually set longer than the non-manipulation process inhibition time after the end of the print operation when the original is automatically set in the original read position by the automatic document feeder unit. With this arrangement, the execution of the non-manipulation process is inhibited for a relatively long time when there is a strong possibility that the operating means will be operated. The execution of the non-manipulation process is enabled in a relatively short time when there is a weak possibility that the operating means will be operated.

In one embodiment, the image forming apparatus has a facsimile function, and the specified process by the non-manipulation process executing means is a process for automatically printing by the printing means an image transmitted from another facsimile.

In one embodiment, the image forming apparatus has a printer function, and the specified process by the non-manipulation process executing means is a process for automatically printing by the printing means an image transmitted from an external computer.

According to the image forming apparatus of the above embodiment, the data received from the outside is subjected to printing by the non-manipulation process executing means.

In one embodiment, the specified process by the non-manipulation process executing means is a process for stabilizing an image formed by driving an image-forming section in the apparatus.

According to the image forming apparatus of this embodiment, the image-forming section in this image forming apparatus is driven for a specified time by the non-manipulation process executing means, so that the image formed by this image forming apparatus is stabilized.

In order to achieve the aforementioned second object, the present invention provides an image forming apparatus having an auto-clear function for automatically setting an operation mode back to an initial mode when no operation is executed for a specified time, comprising:

a changing means capable of changing an auto-clear operating time until the auto-clear effect after the end of a print operation or after the execution of last operation, the changing means setting the auto-clear operating time after the end of the print operation shorter than the auto-clear operating time after the execution of the last operation.

In using this kind of image forming apparatus, there is practically a strong possibility that an operation (instructions for executing the print operation or the like) will be executed after an operation and there is a weak possibility that an operation will be executed after the end of the print operation. Therefore, in this image forming apparatus, the changing means sets the auto-clear operating time after the end of the print operation shorter than the auto-clear operating time after the execution of the last operation. With this arrangement, the auto-clear operating time becomes relatively long when there is a strong possibility that an operation will be executed. This arrangement can effectively prevent the occurrence of a state in which the auto-clear function is disadvantageously effected on the way to the operator's attempt at continuing operation. That is, the operator's operation is not hindered. On the other hand, the auto-clear operating time becomes relatively short when there is a weak possibility that an operation will be executed. This arrangement can effectively prevent the occurrence of a state in which the printing is executed in an unintended operation mode when one operator ends the printing by changing the operation mode from the standard mode into another mode and thereafter the next operator continuously executes the printing. As described above, the auto-clear function can be properly operated.

The present invention provides an image forming apparatus having an auto-clear function for automatically setting an operation mode back to an initial mode when no operation is executed for a specified time, comprising:

an original conveying means for automatically successively conveying original sheets in a stack set on an original tray to a read position; and a changing means capable of changing an auto-clear operating time until the auto-clear effect after the end of a print operation or after the execution of last operation, the changing means setting the auto-clear operating time after the end of the print operation when the original is automatically set in the original read position by the original conveying means 'shorter than the auto-clear operating time after the end of the print operation when the original is manually set in the original read position.

In using this kind of image forming apparatus, there is practically a strong possibility that an operation will be executed after the end of the print operation when the original is manually set in the original read position and there is a weak possibility that an operation will be executed after the end of the print operation when the original is automatically set in the original read position by the original conveying means. Therefore, in this image forming apparatus, the changing means sets the auto-clear operating time after the end of the print operation when the original is automatically set in the original read position by the original conveying means shorter than the auto-clear operating time after the end of the print operation when the original is manually set in the original read position. With this arrangement, the auto-clear operating time becomes relatively long when there is a strong possibility that an operation will be executed. This arrangement can effectively prevent the occurrence of the state in which the auto-clear function is disadvantageously effected on the way to the operator's attempt at continuing operation. That is, the operator's operation is not hindered. On the other hand, the auto-clear operating time becomes relatively short when there is a weak possibility that an operation will be executed. This arrangement can effectively prevent the occurrence of the state in which the printing is executed in an unintended operation mode when one operator ends the printing by changing the operation mode from the standard mode into another mode and thereafter the next operator continuously executes the printing. As described above, the auto-clear function can be properly operated.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the image forming apparatus of the present invention will be described in detail below.

One embodiment of the digital copying machine having the facsimile function will be described in the order of (1) the overall construction, the construction of each part and the outline of the operations, (2) the construction of the control section and the outline of the operation, (3) the operation sequence of the whole copying machine in each operation mode and (4) the outline of the control flow of each CPU.

Figure 1:
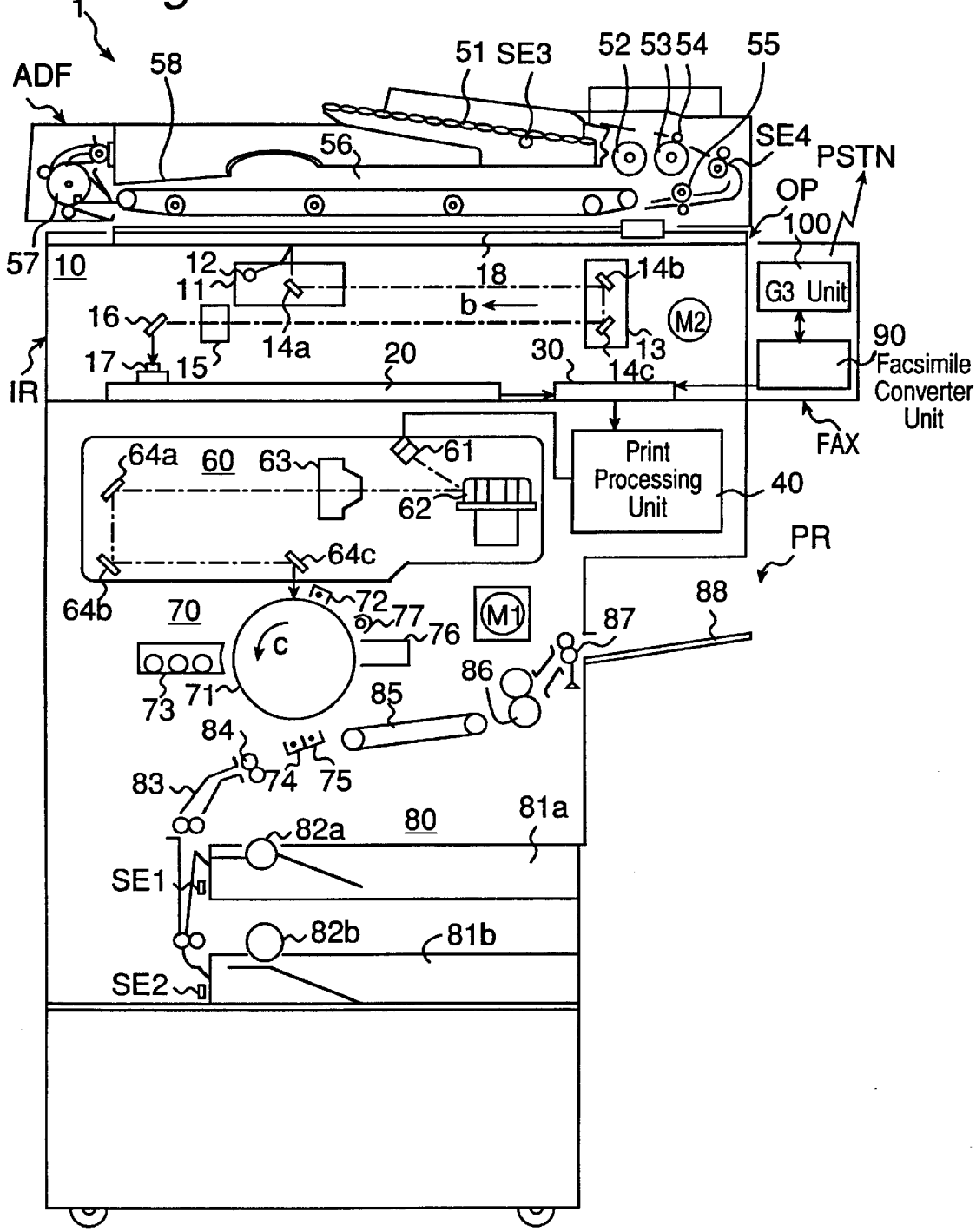
FIG. 1 is a sectional view schematically showing the construction of a digital copying machine 1 according to one embodiment of the present invention.

(1) The Overall Construction, the Construction of Each Part and the Outline of the Operations FIG. 1 is a schematic sectional view schematically showing the construction of a digital copying machine 1 having the facsimile function. The digital copying machine 1 roughly includes an automatic document feeder ADF which serves as the original conveying means, an image reader IR which serves as an original image reading means, a printer PR which serves as a printing means, a facsimile transmitter-receiver FAX and an operation input unit OP (extending in a direction perpendicular to the surface of the sheet) which serves as an operating means. These components are controlled by a control section 200 (see FIG. 3) for controlling each section and the whole system.

The outline of the copy operation will be described. An operation is inputted to the present copying machine by means of the operation input unit OP. The automatic document feeder ADF sets the original sheets to be copied one after another on the image reader IR. Subsequently, the image reader IR reads the image of the set original and generates image data. Subsequently, the printer PR receives the image data from the image reader IR and pints an image on a paper sheet.

The outline of a facsimile transmission operation will be described. An operation is inputted to the present copying machine by means of the operation input unit OP. The automatic document feeder ADF sets the original to be transmitted by facsimile one after another on the image reader IR. Subsequently, the image reader IR reads the image of the set original and generates image data. Subsequently, the facsimile transmitter-receiver FAX receives the image data from the image reader IR and transmits the image data to a telephone line (PSTN).

The outline of a facsimile reception operation will be described. The facsimile transmitter-receiver FAX receives the image data received from the telephone line (PSTN). Subsequently, the image reader IR temporarily stores the image data. Subsequently, the printer PR receives the image data from the image reader IR and prints the image on a paper sheet. These facsimile transmitter-receiver FAX, image reader IR and printer PR operate as non-manipulation process executing means.

The automatic document feeder ADF is provided on the above part of the digital copying machine 1 and constructed of an original tray 51, a pickup roller 52, a handling roller 53, a handling pad 54, a register roller 55, a conveyance belt 56, a reversing roller 57, a paper discharge tray 58 and sensors SE3 and SE4.

A plurality of original sheets can be stacked in a layer form on the original tray 51 with the image-carrying surfaces to be reproduced directed upward. The placed original sheets are fed one after another sequentially from the one in the lowermost layer by the pickup roller 52, handled by the handling roller 53 and the handling pad 54 and then reversed along the conveyance path. The reversed original is conveyed via the register roller 55 and set onto an original table 18 of the image reader IR, and the image of the set original is read by the image reader IR. After the end of read, the original is conveyed by the conveyance belt 56 and discharged via the reversing roller 57 onto the paper discharge tray 58.

In the case of a double-sided original, the original makes a turn around the reversing roller 57 and is put back onto the original table 18. For this reason, the conveyance belt 56 can be rotated forwardly and reversely.

A sensor SE3 detects whether or not an original is set on the original tray 51. A sensor SE4 is located in the conveyance path of the original on the way to the original table 18 of the image reader IR, and the sensor SE4 detects the size and direction of the original on the basis of the time of detection of the original to be conveyed.

It is to be noted here that a state in which the longer side of the original is set parallel to the original feed direction is defined as a lengthwise state, and a state in which the longer side of the original is set perpendicular to the original feed direction is defined as a sidewise state.

The copying can also be executed without using the automatic document feeder ADF. In this case, the operator sets original sheets one after another on the original table 18 of the image reader IR with the automatic document feeder ADF opened. Thereafter, the operator executes copying with the automatic document feeder ADF closed.

Even in this case, the size and direction of the original placed on the original table 18 of the image reader IR are arranged so as to be perceivable. The outer peripheral surface (surface facing the original table 18 of the image reader IR) of the conveyance belt 56 is colored in an orange color. Light which is emitted from an exposure lamp 12 of the image reader IR and reflected on the conveyance belt 56 comes to have a color of a small spectral sensitivity for a line sensor 17 of the image reader IR, and this allows the perception of the area which belongs to the original table 18 of the image reader IR and on which the original is placed. With this arrangement, the size and direction of the original can be detected.

The image reader IR is constructed of a scanning optical system 10 for scanning the original image and generating image data, an image data processing unit 20 for processing image data transmitted from the scanning optical system 10 and a memory unit 30 for storing therein print data by switching between direct outputting of the image data transmitted from the image data processing unit 20 as print data to the printer PR and temporary storing of the image data into a memory.

The scanning optical system 10 is constructed of a first scanner 11, an exposure lamp 12, a second scanner 13, a first mirror 14a, second mirrors 14b and 14c, an imaging lens 15, a mirror 16, a line sensor 17, an original table 18 and a motor M2.

The exposure lamp 12 and the first mirror 14a are supported by a first scanner 11, while the second mirrors 14b and 14c are supported by a second scanner 13. The line sensor 17 is constructed of a CCD in which a plurality of imaging elements are arranged in a line. The first scanner 11 and the second scanner 13 are each driven by the motor M2 so as to move in the direction of arrow b (sub-scanning direction) perpendicular to the direction in which the CCD is arranged (main scanning direction) of the line sensor 17 just below the original table 18. By this movement, the image of the original set on the original table 18 is scanned to be read.

The image data processing unit 20 and the memory unit 30 have a close relation to the control section 200, and therefore, they will be described in connection with "(2) the construction of the control section and the outline of the operation".

The printer PR is constructed of a print processing unit 40 for driving an optical system 60 on the basis of print data transmitted from the memory unit 30 of the image reader IR, an optical system 60 for applying a laser beam having the print data by means of the print processing unit 40, an image-forming system 70 for executing an image-forming process on a paper sheet with the laser beam applied from the optical system 60 and a paper sheet conveyance system 80 for conveying a paper sheet to the image-forming system 70 or from the image-forming system 70.

The print processing unit 40 receives the print data from the memory unit 30 of the image reader IR. On the basis of the print data, the print processing unit 40 executes control of the laser beam applied from the optical system 60.

The optical system 60 is constructed of a semiconductor laser 61, a polygon mirror 62, an fθ lens 63 and mirrors 64a, 64b and 64c.

The semiconductor laser 61 is controlled to be modulated (turned on and off) by the print processing unit 40. The polygon mirror 62 deflects the laser beam applied from the semiconductor laser 61 for the execution of scanning. The fθ lens 63 corrects the distortion, aberration and so on of the deflected laser beam. The mirrors 64a, 64b and 64c guide the thus-obtained laser beam to the image-forming system 70.

The image-forming system 70 is constructed of a photoreceptor drum 71, an electrostatic charger 72, a developer 73, a transfer charger 74, a paper sheet separating charger 75, a cleaner 76 and an eraser lamp 77.

The laser beam that is radiated from the optical system 60 and modulated in accordance with the print data linearly scans the surface of the photoreceptor drum 71 that is uniformly charged by the electrostatic charger 72, thereby forming an electrostatic latent image corresponding to the image to be developed on the photoreceptor drum 71. The thus-formed electrostatic latent image is developed by the developer 73 and transferred by the transfer charger 74 onto the paper sheet that is conveyed by the paper sheet conveyance system 80 described later. The surface of the photoreceptor drum 71 after the transfer is cleaned by the cleaner 76, and the remaining charges are erased by the eraser lamp 77 for the preparation for the next original image.

The paper sheet conveyance system 80 is constructed of paper supply cassettes 81a and 81b, paper supply rollers 82a and 82b, a paper sheet conveyance path 83, a timing roller 84, a conveyance belt 85, a fixing unit 86, a discharge roller 87, a paper discharge tray 88, sensors SE1 and SE2 and a motor M1.

The paper sheets inside the paper supply cassettes 81a and 81b are supplied one by one by the paper supply rollers 82a and 82b and conveyed along the paper sheet conveyance path 83 to the timing roller 84. The timing roller 84 sends the paper sheet to a transfer section between the photoreceptor drum 71 and the transfer charger 74 of the image-forming system 70 in synchronization with the image formed on the photoreceptor drum 71 of the image-forming system 70. The paper sheet onto which the image has been transferred is sent into the fixing unit 86 by the conveyance belt 85. After the image is fixed by the fixing unit 86, the paper sheet is discharged onto the paper discharge tray 88 by the discharge roller 87. The main motor M1 drives the paper sheet conveyance system 80 and the photoreceptor drum of the image-forming system 70.

The paper supply cassettes 81a and 81b can accommodate therein B5-size and A4-size paper sheets lengthwise and sidewise, respectively, as well as B4-size and A3-size paper sheets lengthwise. Paper sheets each having any one of the above sizes are accommodated in a stack state in the paper supply cassettes 81a and 81b. The size and direction of the accommodated paper sheets are detected by the sensors SE1 and SE2.

It is to be noted that the state in which the longer side of the paper sheet is set parallel to the paper sheet feed direction is defined as the lengthwise state, and the state in which the longer side of the paper sheet is set perpendicular to the paper sheet feed direction is defined as the sidewise state.

The facsimile transmitter-receiver FAX is constructed of a facsimile converter unit 90 and a G3 unit 100. These units have close relations to the control section, and therefore, they will be described in connection with "(2) the construction of the control section and the outline of the operation".

Figure 2:
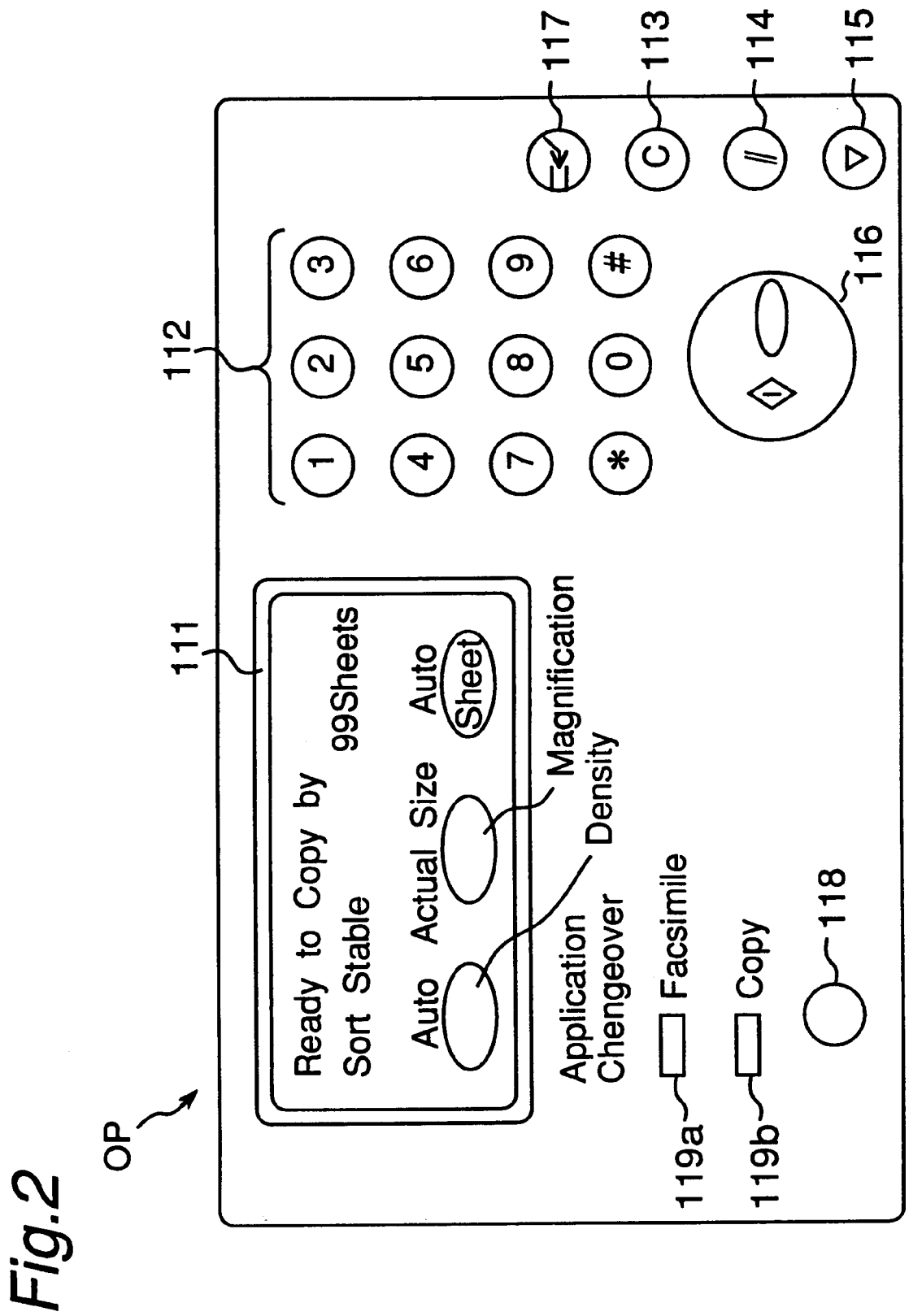
FIG. 2 is a plan view showing the construction of an operation input unit OP of the digital copying machine 1 shown in FIG. 1.

FIG. 2 is a plan view of the operation input unit OP provided on the upper surface of the digital copying machine 1. The operation input unit OP is constructed of an LCD (Liquid Crystal Display) touch panel 111, a ten-digit keypad 112, a clear key 113, a reset key 114, a stop key 115, a start key 116, an interrupt key 117, an application changeover key 118 and display sections 119a and 119b.

The LCD touch panel 111 displays the information of the state of operation of the copying machine, such as the exposure level, magnification ratio and recording paper size, various abnormal states of the copying machine, such as the occurrence of jam, the occurrence of service personnel call and the occurrence of paper emptiness, the facsimile mode and the state of operation of the facsimile during communications, such as the facsimile number of the other party, the resolution of transmission and polling and other information.

By using the LCD touch panel 111, there can be entered inputs for designating the copy operation parameters such as the density, the magnification ratio and the recording paper sheet and the automatic selection mode of the resolution of transmission and so on.

The ten-digit keypad 112 is used for inputting the numerals such as the number of sheets to be copied, the magnification ratio and the facsimile number of the other party. The clear key 113 is used for setting the numerals and so on back to the standard value "1". The reset key 114 is used for setting the set value set inside the digital copying machine back to the standard value.

The stop key 115 is used for stopping the copy operation and the facsimile operation. The start key 116 is used for starting the copy operation and the facsimile operation. The interrupt key 117 is used for interrupting the auto-print for the execution of copying, manual printing or the like.

Further, the operation panel OP is provided with the application changeover key 118 for changing over between a facsimile mode and a copy mode and further provided with a display section 119a for displaying the selection of the facsimile mode and a display section 119b for displaying the selection of the copy mode and so on.

(2) The Construction of the Control Section and the Outline of the Operation

Figure 3:
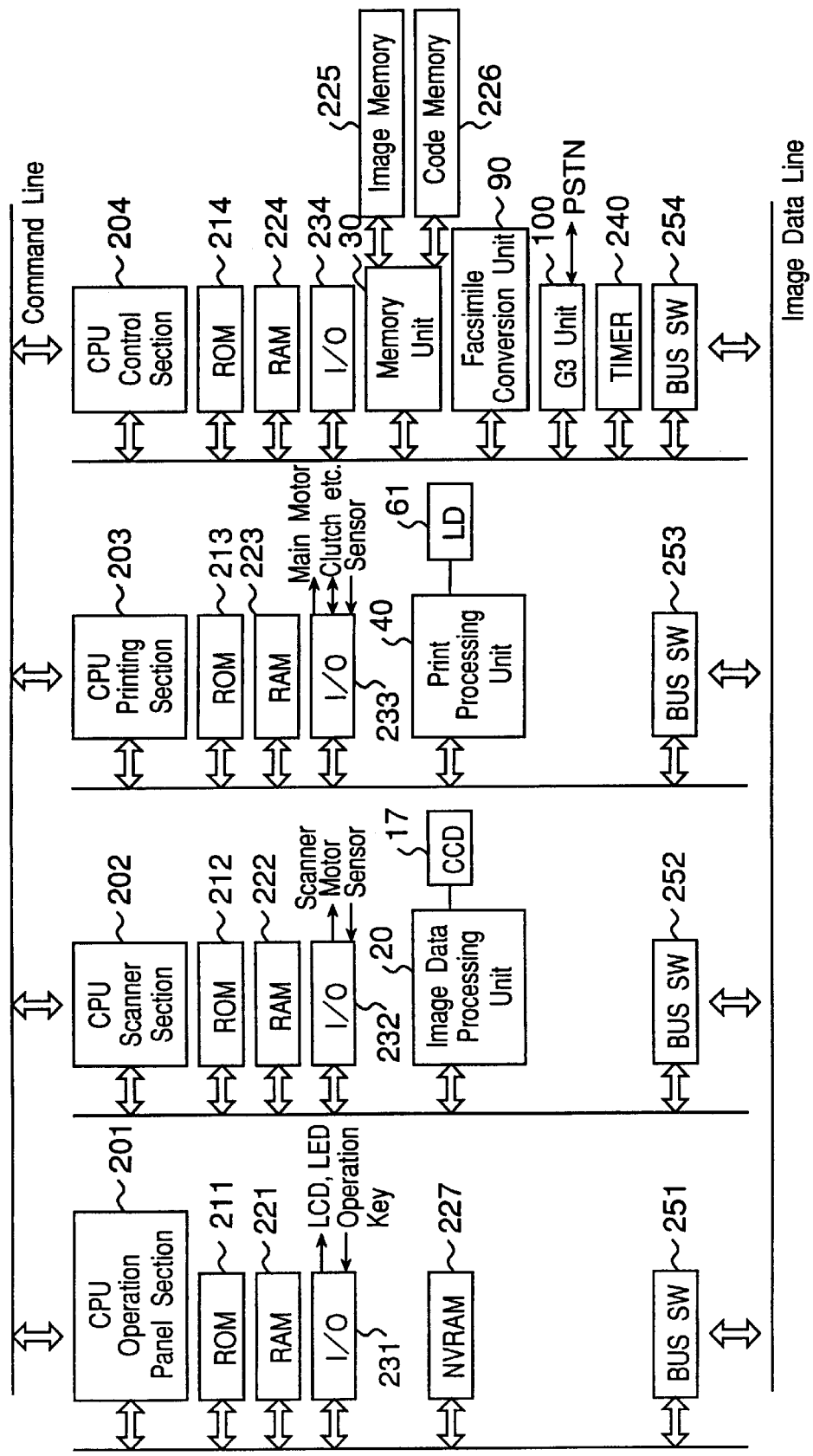
FIG. 3 is a block diagram of a control section 200.

FIG. 3 is a block diagram showing the construction of the control section 200 of the digital copying machine 1. The control section 200 is constructed mainly of four CPUs of CPU 201 through CPU 204. The CPU 201 through CPU 204 are connected to ROM 211 through ROM 214 which store therein respective programs, RAM 221 through RAM. 224 which serve as a work area and so on.

The CPU 201 through CPU 204 are connected to each other on a command line and constructed so that necessary command information are exchanged. It is to be noted that the input and output of image data are executed through the image data line, when each section is connected to the image data line via respective BUS SWs (bus switches) 251 through 254.

Further, the CPUs are connected to the components as follows. The CPU 201 is connected to the LCD, an LED (Light Emitting Diode) and an operation key of the operation input unit OP via an I/O interface 231 and connected to an NVRAM (non-volatile RAM) 227. The CPU 202 is connected to the scanner motor M2 of the image reader IR via an I/O interface 232 and connected to the image data processing unit 20 for inputting image data from the CCD on the line sensor 17. The CPU 203 is connected to the main motor M1 of the printer PR, a clutch and the sensors SE1 and SE2 via an I/O interface 233 and connected to the print processing unit 40 for outputting image data to the semiconductor laser 61. The CPU 204 is connected to an I/O interface 234 and connected to an image memory 225 and a code memory 226 inside the memory unit 30, the facsimile converter unit 90, a TIMER 240, the telephone line (PSTN) and the G3 unit 100.

The operations of the CPUs will be described next. The CPU 201 executes control of input from various operation keys of the operation input unit OP and a display output to the display section via the I/O interface 231. It is to be noted that the initial mode setting of the operation panel OP, a total count, an item count and a personal identification number are stored in the NVRAM 227.

The CPU 202 controls each section of the image data processing unit 20 of the image reader IR and the driving of the scanning optical system 10 and the automatic document feeder ADF via the I/O interface 232.

The CPU 203 executes control of the print processing unit 40 of the printer PR, the optical system 60 and the image-forming system 70 via the I/O interface 233.

The CPU 204 executes processing for the total timing adjustment of the control section 200 and the setting of the operation mode via the I/O interface 234. The CPU 204 controls the memory unit 30, thereby temporarily storing read image data into the image memory 225 and the code memory 226. In the copy mode, the stored image data is read and outputted to the print processing unit of the printer PR. In the case of facsimile transmission in the facsimile mode, the image data is outputted to the facsimile converter unit 90 of the facsimile transmitter-receiver FAX and thereafter outputted to the telephone line (PSTN) via the G3 unit. In the case of facsimile reception in the facsimile mode, image data from the telephone line (PSTN) is received by the G3 unit 100 and temporarily stored in the image memory 225 and the code memory 226 via the facsimile converter unit 90. The stored image data is read and outputted to the print processing unit of the printer PR.

In the facsimile mode, the CPU 204 controls the facsimile converter unit 90, thereby executing data conversion of pixel density converting process and so on between the memory unit 30 and the G3 unit 100.

Sections having a close relation to the CPUs will be described next.

First, reference is made to the image data processing unit 20. The image data processing unit 20 is constructed of an A/D (analog-to-digital) converter, a shading correcting section, a variable magnification processing section, an image quality correcting section and so on. The image data processing unit 20 processes an image signal outputted from the line sensor 17 of the scanning optical system 10 and outputs image data to the memory unit 30. The image signal inputted from the line sensor 17 is subjected to analog-to-digital conversion in the image processing unit 20 and quantized into 8-bit image data for every pixel. The image data is further subjected to various processes such as shading correction, variable magnification processing and image quality correction and thereafter outputted as image data.

Reference is made to the memory unit 30. The memory unit 30 is constructed of a binary processing section for forming binary data based on parameter setting from the changeover section and the CPU 204, a multi-port image memory 225 having a capacity of two pages of the A4-size sheet at a resolution of 400 dpi, a code processing section having a compressor and a decompressor which are independently operable, a code memory 226 having a multiple port, a multi-value processing section for forming multi-value data based on parameter setting from a rotation processing section and the CPU 204 and so on. The CPU 204 totally controls these components.

Reference is made to the facsimile converter unit 90. The facsimile converter unit 90 is located between the memory unit 30 and the G3 unit 100 and executes format conversion of image information during transmission and reception. The format conversion of image information is exemplified by:

(a) pixel density conversion of image data,
(b) expansion and contraction of image data,
(c) bit width conversion of code data, and
(d) coding system conversion of code data.

These processes are controlled by the CPU 204.

(3) Operation Sequence of the Whole Copying Machine in Each Operation Mode

The operation sequence of the whole copying machine in each operation mode will be described below. It is to be noted that the reference is made principally to commands of request, reply and so on that are exchanged between the CPU 201 through CPU 204 or the flow of data, and no description is provided for the commands of request, reply and so on of small importance.

(3-1) Operation sequence in copy mode

In the copy mode, image data read by the image reader IR is once written into the image memory 225 and then outputted from this image memory 225 to the print processing unit 40 for the execution of printing.

Figure 4:
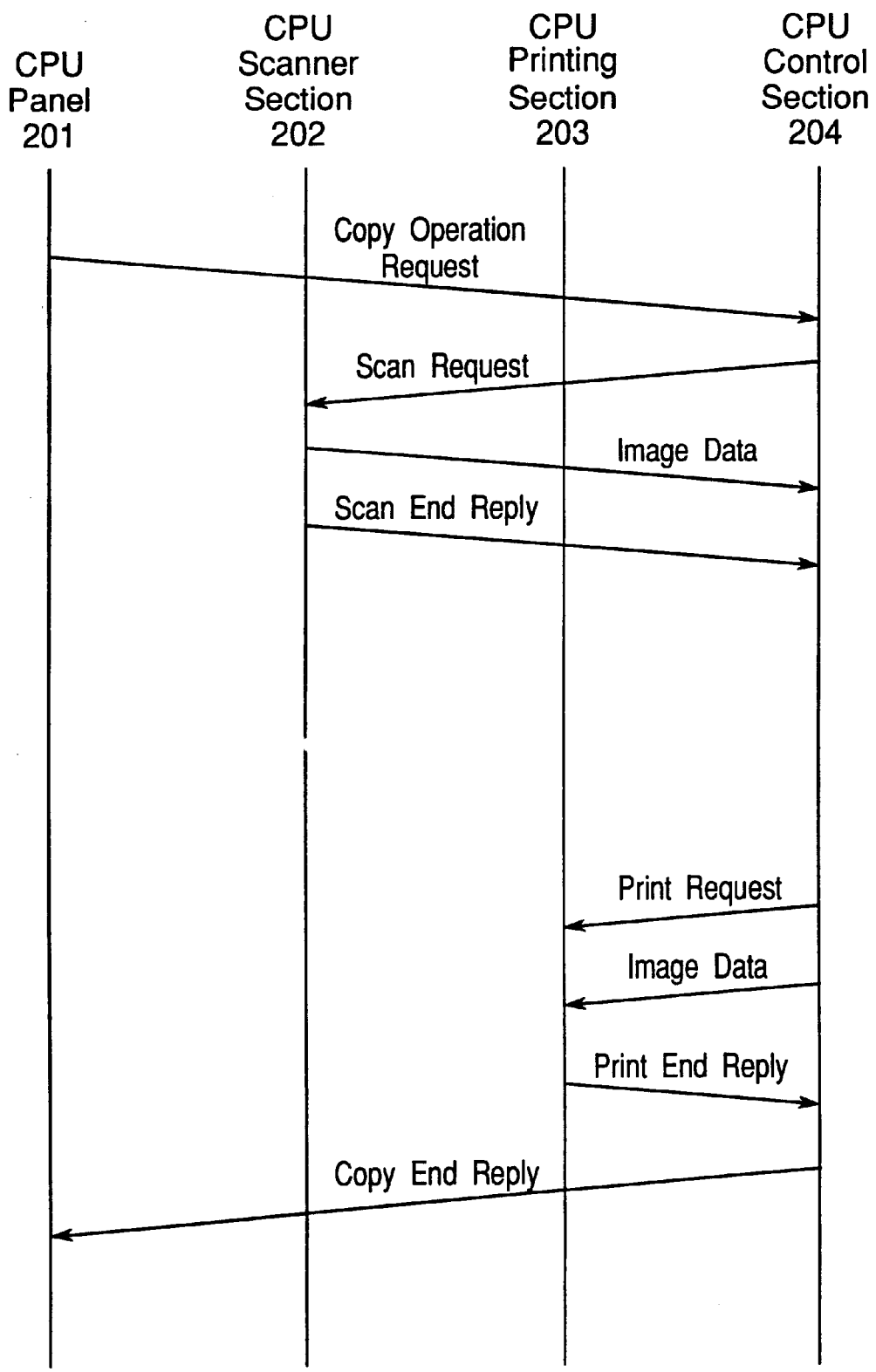
FIG. 4 is a view showing a state in which commands and image data are exchanged between CPUs in a copy operation.

FIG. 4 is a view showing the operation sequence in the copy mode. In detail, the operation sequence is as follows with reference to FIG. 4. In the copy mode, by depressing the start key 116, a copy operation request is issued from the CPU 201 to the CPU 204. In response to this, a scan request is issued from the CPU 204 to the CPU 202. By this operation, the CPU 202 starts scanning, and when reaching the image area of the original, the CPU 202 executes image processing corresponding to the set image processing mode, and the processed image data is outputted to the memory unit 30 and stored into the image memory 225.

When the read of the original image by the scanning is completed, a scan end reply is issued from the CPU 202 to the CPU 204, and thereafter a print request is issued from the CPU 204 to the CPU 203. By this operation, the CPU 204 reads the image data for copying from the image memory 225 and outputs the image data to the print processing unit 40. The print processing unit 40 starts printing of the outputted image data. When the printing ends, a print end reply is issued from the CPU 203 to the CPU 204, while the CPU 204 clears the image memory 225 and issues a copy end reply to the CPU 201 to end the operation. When the automatic document feeder ADF is used, the processing from the scan request to the clearing of the image memory 225 is repetitively executed by the number of original sheets. When this processing of all the original sheets ends, the copy end reply representing the end of copying by means of the ADF is outputted to the CPU 201.

(3-2) Operation sequence in facsimile transmission operation

In the facsimile transmission operation, the image data read by the image reader IR is once written into the image memory 225, subjected to a compressing process, stored into the code memory 226 and thereafter data-converted by the facsimile converter unit 90, so that the image data is transmitted.

(3-3) Operation sequence in facsimile reception mode

In the facsimile reception operation, the received image data is data-converted by the facsimile converter unit 90, stored into the code memory 226, subjected to a decompressing process and then written into the image memory 225. Thereafter, image output to the CPU 201 is requested, and when this is permitted, the image data is read to the printer PR and printed.

Figure 5:
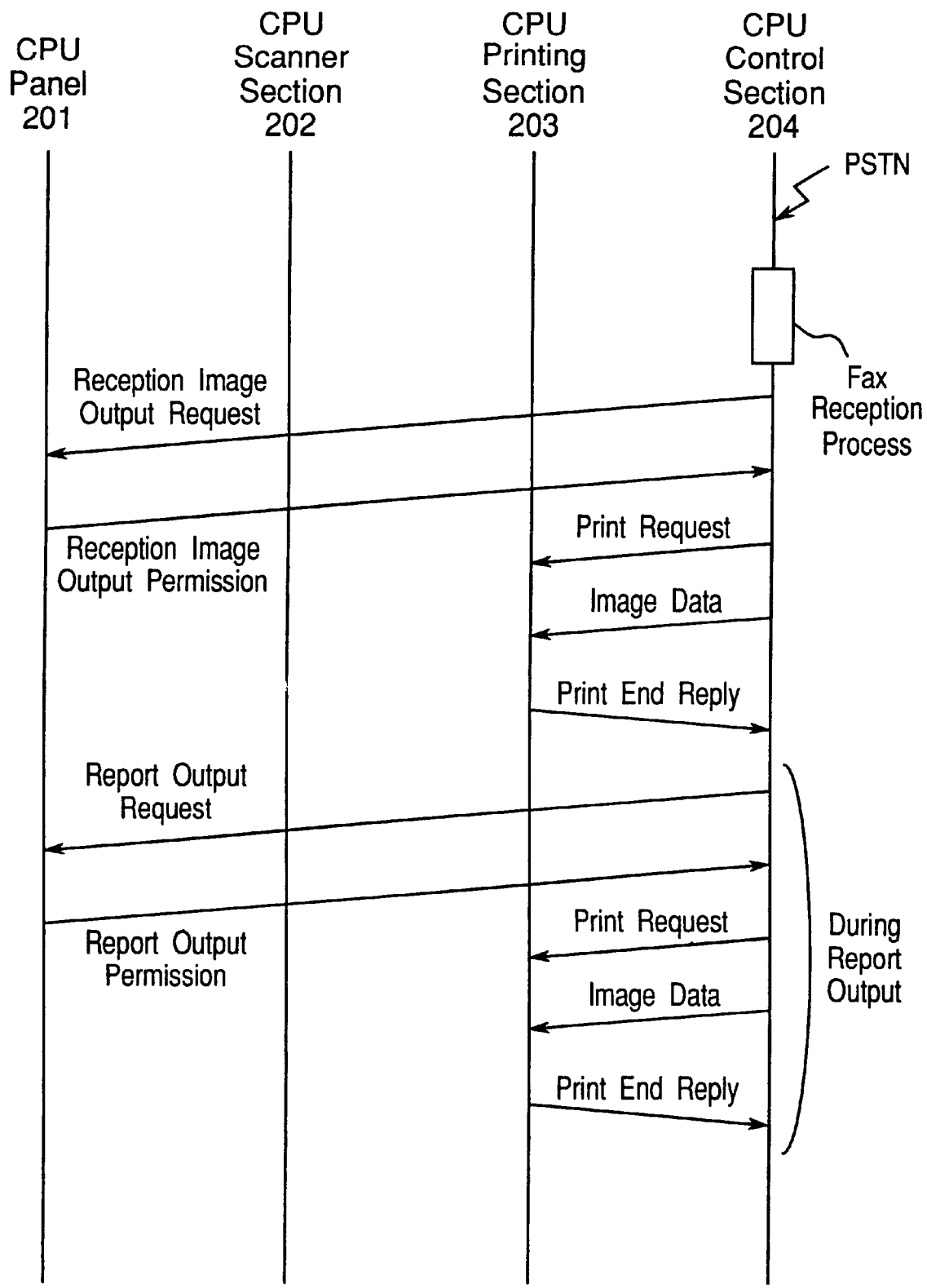
FIG. 5 is a view showing a state in which commands and image data are exchanged between CPUs in a facsimile reception operation.

FIG. 5 shows a view showing the operation sequence in the facsimile reception mode. In detail, the operation sequence is as follows with reference to FIG. 5. If the call transmitting side issues a request for the reply of the call to the CPU 204, then the CPU 204 executes line connection. Next, the CPU 204 executes setting of the coding system, the reception magnification ratio, the number of pixels per line of the received image, the number of pixels per line of the input image, the maximum permissible number of lines of error and so on in the image reception mode.

If the preparation for the reception of the code memory 226 is completed, then the image data transmitted from the call transmitting side is demodulated by a modem inside the G3 unit 100, data-converted by the facsimile converter unit 90 and thereafter stored into the code memory 226. When the reception of the image data ends, the CPU 204 executes a line disconnecting process.

Subsequently, an image output request is issued from the CPU 204 to the CPU 201. The CPU 201 that is managing the operation input unit OP decides whether or not the current state is the print enabled state. When the current state is the print enabled state, the CPU 201 outputs image output permission to the CPU 204. On the basis of this permission, the CPU 204 issues a print request to the CPU 203. When the CPU 204 issues the print request, the CPU 204 executes the code data decompressing process. The image data obtained through the code data decompressing process is written into the image memory 225. The image data read from the image memory 225 is outputted to the printer PR for the execution of printing. When the printing ends, the CPU 203 issues a print end reply to the CPU 204. Upon receiving this, the CPU 204 clears the memory and ends the operation.

(4) Contents of the Control Flow of Each CPU

The outline of the control flow to be executed by the CPU 201 through CPU 204 will be described next. These four CPUs operate mutually independently except for the processing relevant to the transmission and reception of commands.

(4-1) Control flow of CPU 201

Figure 6:
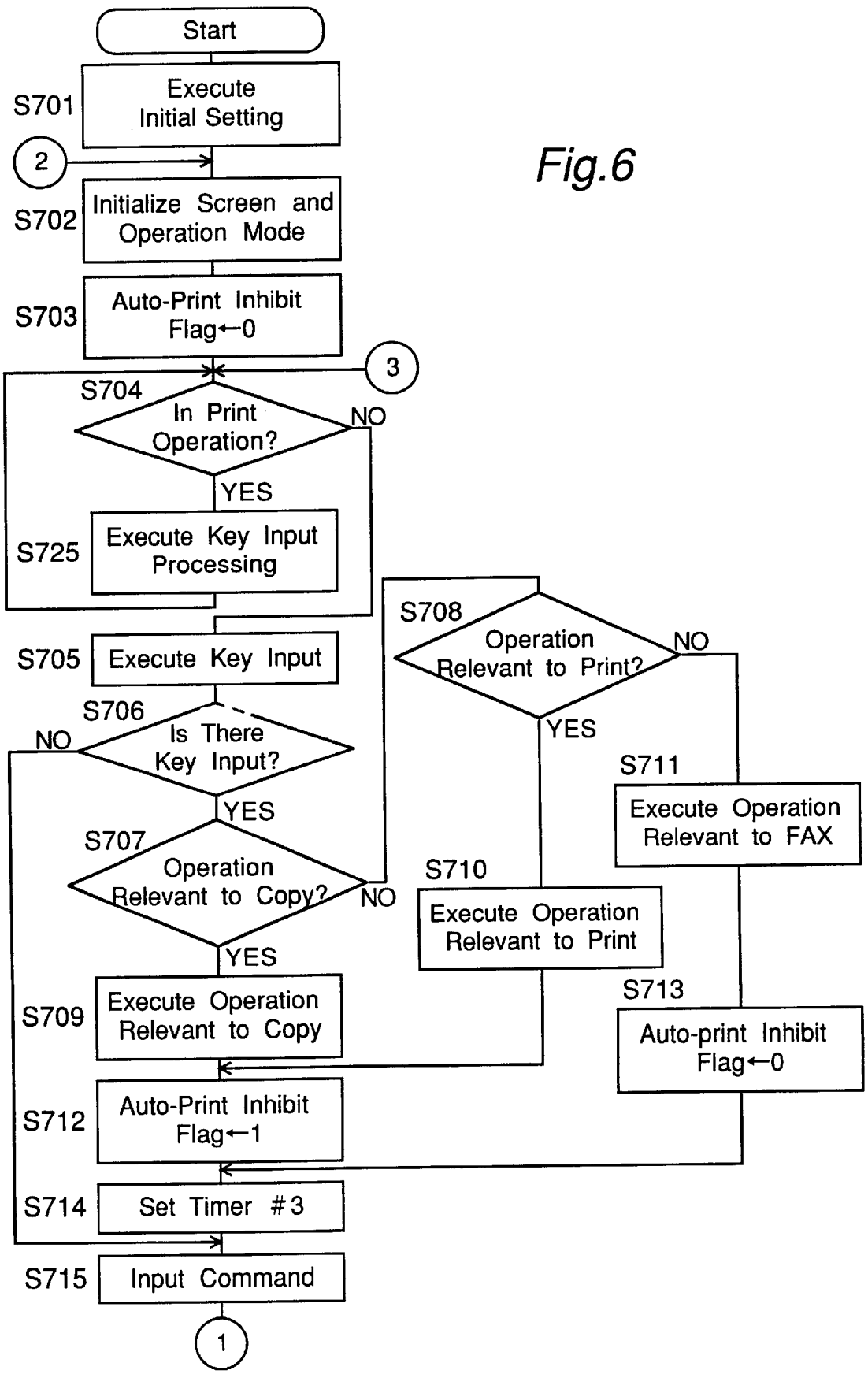
FIG. 6 is part of a flowchart of a main routine showing the procedure of control executed by a CPU 201.
Figure 7:
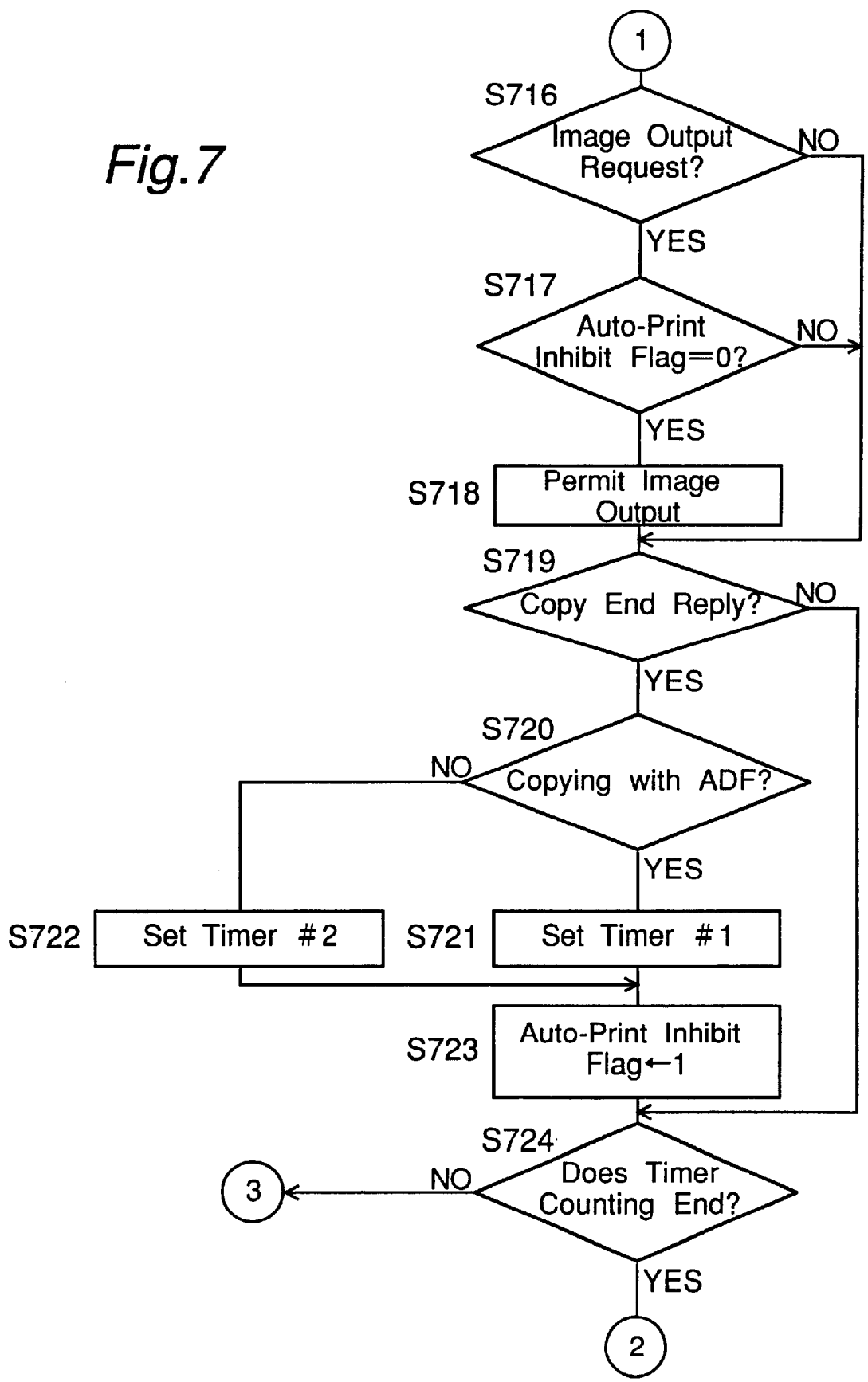
FIG. 7 is the remaining part of the flowchart of the main routine showing the procedure of control executed by the CPU 201.

A flow chart showing the control flow of the CPU 201 for the operation input unit OP is shown in FIG. 6 and FIG. 7. In the operation input unit OP, subsequent to the turning-on of the power of the present copying machine, a panel display program stored in the ROM 211 and the data of an initial display mode and a standard operation mode (initial mode) stored in the NVRAM 227 are read in an initial setting subroutine (S701). By this operation, an initial screen is displayed on the operation input unit OP, and the operation mode is initialized (automatically cleared) (S702). Next, the CPU 201 sets an auto-print inhibit flag to zero (value representing the permission of auto-print) (S703). Next, the operation state of the printer PR is received from the CPU 204. When the printer PR is in operation (YES in S704), a process corresponding to the necessary minimum key input such as stop key acceptance is executed (S725); and thereafter, the program flow returns again to the, decision of the operation state of the printer PR (S704). If the printer PR is not in operation (NO in S704), then the key input process (S705) in the standby state is executed.

If a key input process is discriminated (S706) as a consequence of the key input process (S705), then it is decided whether or not the key input is an operation relevant to copy (S707) and whether or not the key input is an operation relevant to print (S708). The operation relevant to print is herein defined as the outputting of a communications management report formed independently in the present copying machine by a manual operation and so on. If it is determined that the key input is an operation relevant to either the copy or print (YES in S707 and S708), then a process relevant to the display section of the operation input unit OP, a process relevant to the request to the CPU 204 and so on are executed (S709, S710), and the auto-print inhibit flag is set to one (value representing the inhibition of auto-print) (S712). If the key input is an operation other than those relevant to copy and print, meaning that the key input is an operation relevant to facsimile transmission or the like (NO in S707 and S708), then a process relevant to the display section, a process relevant to the request to the CPU 204 and so on are executed (S711), and thereafter the auto-print inhibit flag is set to zero (S713). After the auto-print inhibit flag is set to one or zero, a timer #3 is set (S714).

If no key input occurs (NO in S706), then the program flow jumps to the next command input (S715). The request and reply from the CPU 204 are taken into the CPU 201 by the command input (S715). If an image output request is received (YES in S716) and further the auto-print inhibit flag is zero (YES in S717), then the image output permission is transmitted to the CPU 204 (S718). If no image output request is issued (NO in S716) or if the auto-print inhibit flag is not zero (NO in S717), then the process of the image output permission (S718) is skipped.

Next, if the copy end reply is taken in (YES in S719) by the command input (S715) and there is an already set timer, then the timer is reset. Depending on whether or not the ended copy operation has been executed by the automatic document feeder ADF (S720), a timer #1 is set when the ADF is used (S721), or a timer #2 is set when the ADF is not used (S722) and the auto-print inhibit flag is set to one (S723) when the ADF is not used. Subsequently, it is decided whether or not the time counting of the set timer is completed (S724). If the counting of the set timer is completed, the program flow returns to the routine of initializing the display screen and the operation mode (S702). The process in S702 corresponds to the auto-clear function. If the counting of the set timer is not completed, then the program flow returns to the decision of the operation state of the printer PR (S704) to repeat the subsequent processes.

In the above embodiment, the timers #1 through 3 are also used for the setting of the auto-print inhibition time and the auto-clear operating time.

In this case, the setting times T1, T2 and T3 of the timers #1 through 3 have duration set so that:

T1<T2<T3.

As a result, through the process of the CPU 201 as described above, the auto-print inhibition time T3 after the end of the panel operation, which is considered to have the strongest possibility that a copy operation will be continuously executed after the end of copying, becomes longest in the present copying machine. Therefore, this arrangement can effectively prevent the occurrence of the state in which the auto-print is disadvantageously started since the auto-print inhibition has already been released when the operator tries to execute the operation. Therefore, the operator's operation is not hindered. On the contrary, the auto-print inhibition time T1 after the end of the copying by means of the automatic document feeder ADF, which is considered to have the weakest possibility that a copy operation will be continuously executed, becomes shortest. Therefore, the auto-print inhibition is not unnecessarily continued when the operator does not continuously execute copying. Therefore, the print job can be prevented from accumulating. The auto-print inhibition time T2 after the end of the copying by the manual placement of the original, which is considered to have the medium possibility that a copy operation will be continuously executed, comes to have a duration between T1 and T3. As described above, the present copying machine can properly inhibit the auto-print.

Similar to this, the auto-clear operating time T3 at the time of the panel operation, which is considered to have the strongest possibility that a copy operation will be continuously executed after the end of copying, becomes longest. Therefore, this arrangement can effectively prevent the occurrence of the state in which the auto-clear function is disadvantageously effected on the way to the mode setting operation when the operator tries to execute the copying in another operation mode. Therefore, the operator's operation is not hindered. On the contrary, the auto-clear operating time T1 after the end of the copying by means of the automatic document feeder ADF, which is considered to have the weakest possibility that a copy operation will be continuously executed, becomes the shortest. Therefore, this arrangement can effectively prevent the occurrence of the state in which the copying is executed in an unintended operation mode (failed copy) when one operator ends the copying by changing the operation mode from the standard mode into another mode and thereafter the next operator continues copying. The auto-clear operating time T2 after the end of the copying by the manual placement of the original, which is considered to have the medium possibility that a copy operation will be continuously executed, comes to have a duration between T1 and T3. As described above, the present copying machine can properly effect the auto-clear function.

(4-2) Control flow of CPU 202

Figure 8:
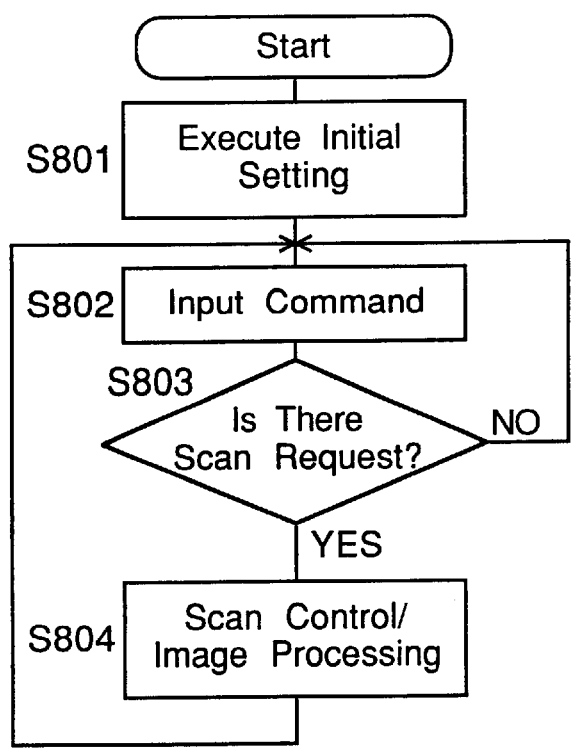
FIG. 8 is a flowchart of a main routine showing the procedure of control executed by a CPU 202.

A flow chart showing the control flow of the CPU 202 for the scanner section (image processing section 20 and scanning optical system 10) is shown in FIG. 8. In the scanner section, initialization is executed by a program registered in a ROM 212 after the power is turned on (S801). Subsequently, the program flow enters into a state of wait for a command from the CPU 202 (S802, S803). If a command is inputted from the CPU 204 (S802) and a scan request is detected (YES in S803) in a scan request branch (S803), then the program flow enters into a scan control/image processing routine (S804). If no scan request occurs (NO in S803), then the state of wait for the command is maintained (S802). In the scan control/image processing routine (S804), scanning and image processing are executed in the image reading mode of the resolution, gradation and so on transmitted together with the scan request from the CPU 204. Subsequently, the image data is transmitted to the CPU 204, and thereafter, a scan end reply is transmitted to the CPU 204. After ending these processes, the program flow enters again into the state of wait for a command (S802).

(4-3) Control flow of CPU 203

Figure 9:
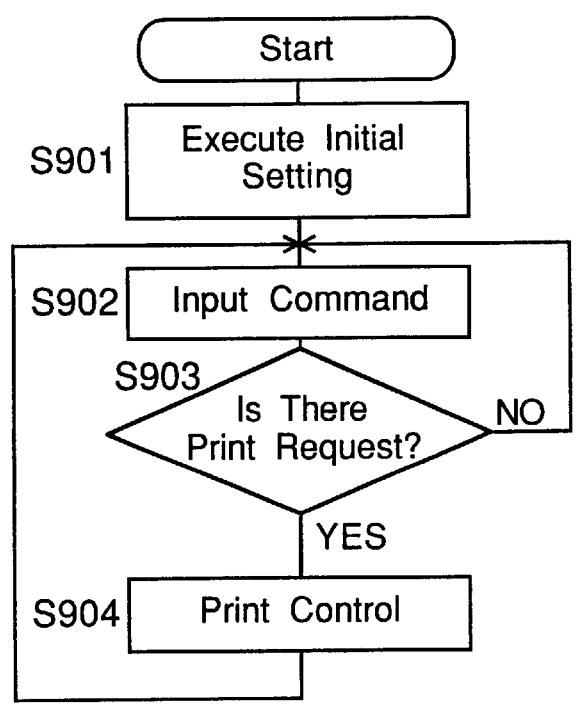
FIG. 9 is a flowchart of a main routine showing the procedure of control executed by a CPU 203.

A flow chart showing the control flow of the CPU 203 for the printing section (print processing unit 40, optical system 60 and image-forming system 70) is shown in FIG. 9. In the printing section, initialization is executed by a program registered in a ROM 213 after the power is turned on (S901). Subsequently, the program flow enters into a state of wait for a command from the CPU 204 (S902, S903). If a command is inputted from the CPU 204 (S902) and a print request is detected (YES in S903) in a print request branch (S903), then the program flow enters into a print control routine (S904). If no print request occurs (NO in S903), then the state of wait for the command is maintained (S902). In the print control routine (S904), print processing is executed in the printing mode of the resolution, gradation and so on transmitted together with the print request from the CPU 204. Subsequently, the image data transmitted from the CPU 204 is transmitted to the printer PR for the execution of printing, and thereafter, a print end reply is transmitted to the CPU 204. After ending these processes, the program flow enters again into the state of wait for a command (S902).

(4-4) Control flow of CPU 204

Figure 10:
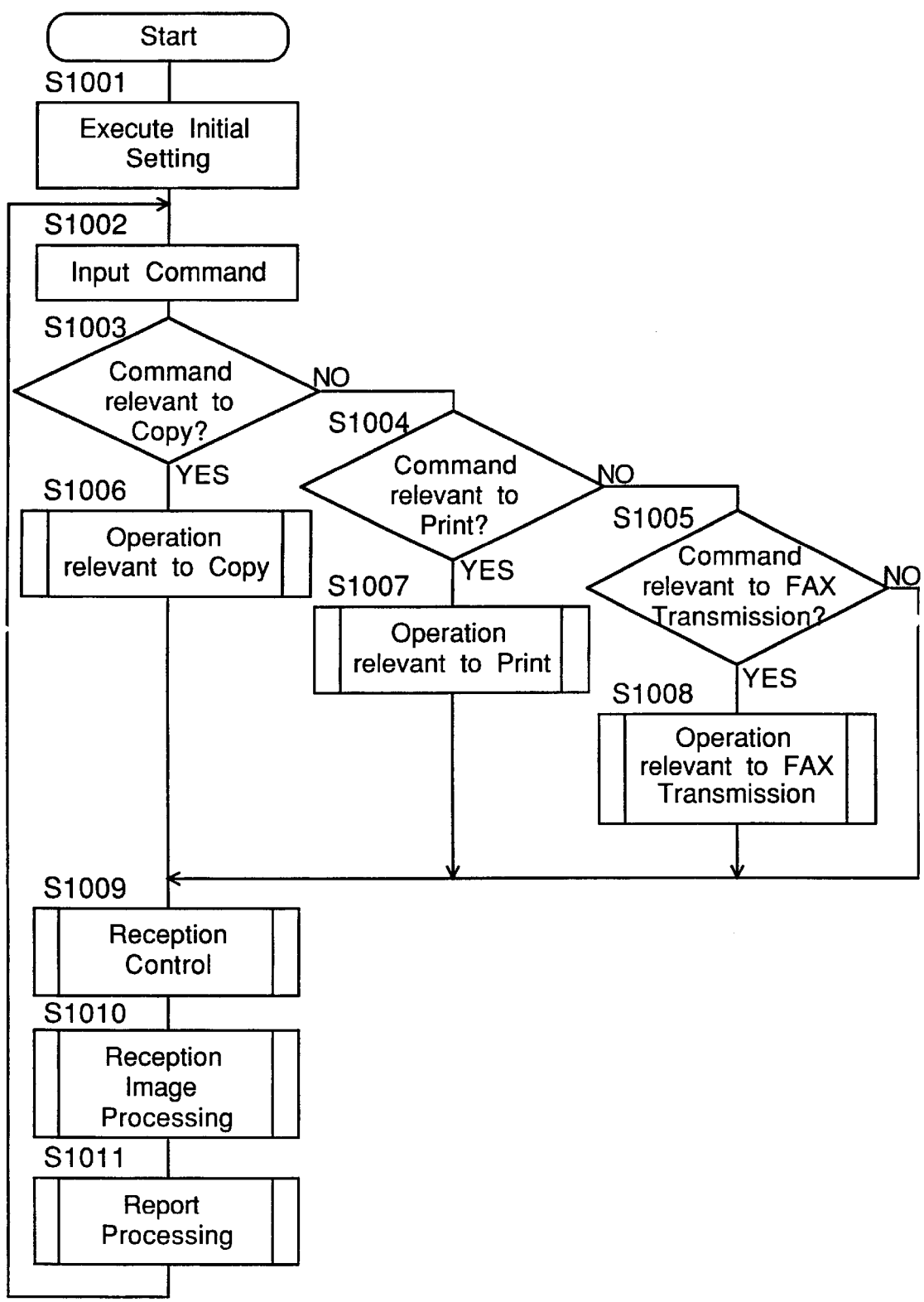
FIG. 10 is a flowchart of a main routine showing the procedure of control executed by a CPU 204.

A flow chart showing the control flow of the CPU 204 for the control section 200 is shown in FIG. 10. In the control section 200, initialization is executed by a program registered in a ROM 214 after the power is turned on (S1001). Subsequently, if a command from the CPU 201 for controlling the operation input unit OP is inputted (S1002), then it is decided whether the command is relevant to copy (S1003) or relevant to print (S1004) or relevant to facsimile transmission or the like other than the above (S1005). According to the decision, a process relevant to copy (S1006), a process relevant to print (S1007) or a process relevant to facsimile transmission or the like other than the above (S1008) is executed. Through these processes, the CPU 204 exchanges the scan request, print request and image data with the CPU 201 through CPU 203 for controlling the respective processes and so on and receives the scan end reply, print end reply and so on from these CPUs.

If facsimile reception occurs in the G3 unit 100 from the telephone line (PSTN), then a process is executed in a reception control routine for receiving image data (S1009). After this process ends, a reception image output is made in a reception image processing routine (S1010). If there occurs a necessity of an output concerning the occurrence of an error, a facsimile communications management report or the like, then a process is executed in a report processing routine (S1011). After these processes end, the program flow enters again into the state of wait for a command (S1002).

The process flow of the reception image processing routine (S1010) as an example of the auto-print processing in FIG. 10 will be described with reference to FIG. 11. First, it is decided whether or not the current timing is a reception image output timing (S1101). In this case, it is determined that the current timing is the reception image output timing when the received image is stored into the memory. If it is determined that the current timing is not the reception image output timing (NO in S1101), then the CPU 204 ends the present routine. If it is determined that the current timing is the reception image output timing (YES in S1101), then a reception image output request is outputted to the CPU 201 (S1102). Subsequently, if image output permission is taken into the CPU 204 (YES in S1104) by a command input (S1103), then a print request is outputted to the CPU 203 (S1105). If the image output permission is not inputted (NO in S1104), then the CPU 204 ends the present routine.

If the printing ends after the print request (S1106), then it is decided whether or not the next page exists (S1107). If the next page exists (YES in S1107), then the program flow returns to the image output request (S1102) to repeat the subsequent processes. If no next page exists (NO in S1107), then the CPU 204 ends the present routine.

Figure 11:
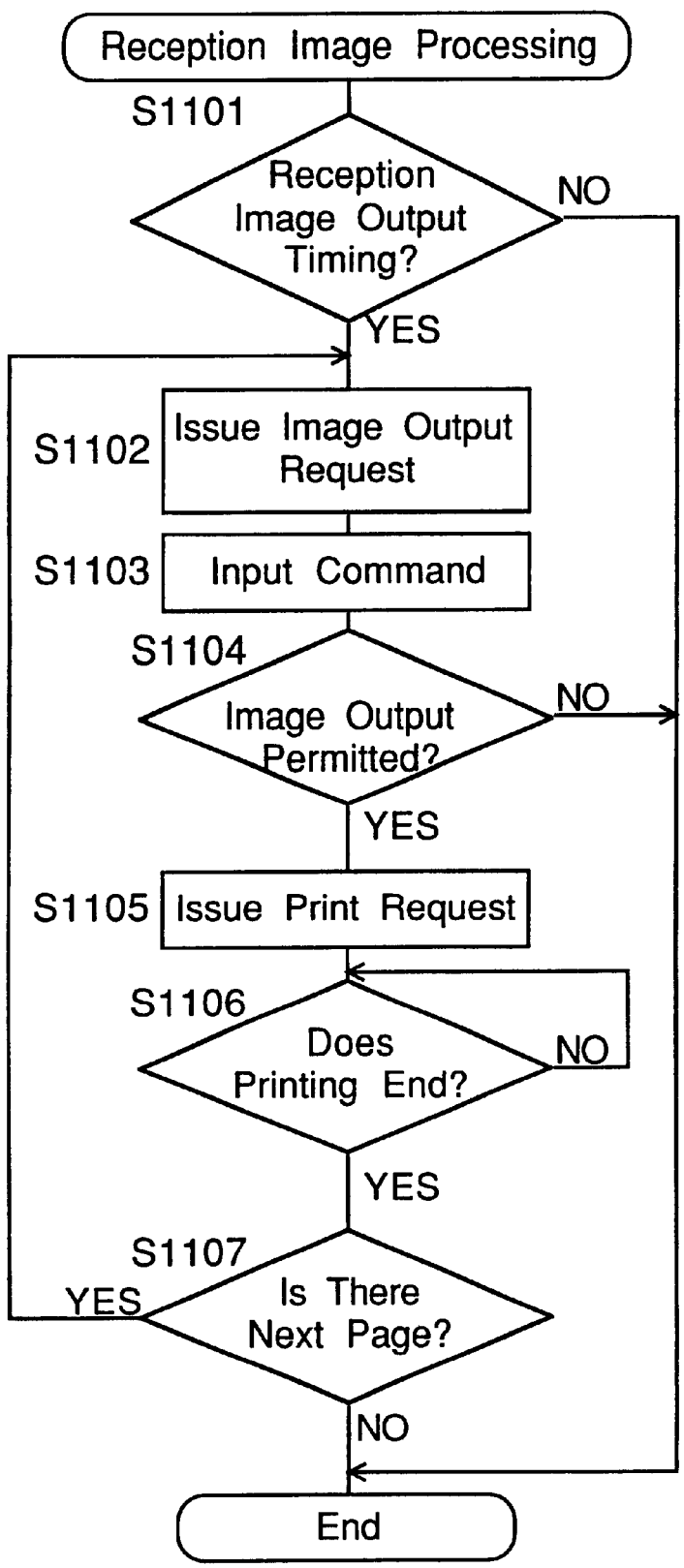
FIG. 11 is a flowchart showing the procedure of a reception image processing subroutine of a step S1010 shown in FIG. 10.

In FIG. 11, if the auto-print is once started, then the program flow cannot escape this routine until the printing ends. Therefore, during the auto-print, the process of inputting a command from the operation input unit OP in S1002 in FIG. 10 cannot be executed, and the input from the operation input unit OP becomes ineffective, so that neither new copy operation nor the like can be executed.

Although the case where the auto-print is started at the point of time when the facsimile reception data is stored into the memory has been described in connection with the above embodiment, the present invention is not limited to this. The present invention can also be applied to the case where the auto-print is started upon receiving reception data or the like from an external computer.

The non-manipulation process is not limited to the auto-print and may be image stabilization to be executed by driving the image-forming section inside the image forming apparatus for a specified time. The image stabilization operation is automatically executed regardless of the user's operation, and the operational input and printing are inhibited during execution.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming apparatus provided with a printing means, comprising:

an operating means for setting an operation mode and issuing instructions of printing based on a set operation mode;

an image reading means for reading an original image to obtain image data;

a print control means for printing by the printing means the image data according to the instructions of the operating means;

a non-manipulation process executing means for executing a specified process regardless of the operation of the operating means;

an inhibiting means for inhibiting the execution of the process by the non-manipulation process executing means for an inhibition time; and a changing means for changing the inhibition time according to an operation state of the operating means and an operation state of the apparatus.

2. An image forming apparatus as claimed in claim 1, wherein the changing means sets the inhibition time after the end of the operation of the operating means longer than the inhibition time after the end of the print operation of the printing means.

3. An image forming apparatus as claimed in claim 1, further comprising:

an automatic document feeder unit for successively conveying original sheets in a stack set on an original tray to a read position, the changing means setting the inhibition time after the end of the print operation when the original is manually set longer than the inhibition time after the end of the print operation when the original is set by the automatic document feeder unit.

4. An image forming apparatus as claimed in claim 1, wherein the image forming apparatus has a facsimile function, and the specified process by the non-manipulation process executing means is a process for automatically printing by the printing means an image transmitted from another facsimile.

5. An image forming apparatus as claimed in claim 1, wherein the image forming apparatus has a printer function, and the specified process by the non-manipulation process executing means is a process for automatically printing by the printing means an image transmitted from an external computer.

6. An image forming apparatus as claimed in claim 1, wherein the specified process by the non-manipulation process executing means is a process for stabilizing an image formed by driving an image-forming section in the apparatus.

7. An image forming apparatus having a copying function for reading an original image and executing printing and an automatic printing function for automatically printing an image received externally, comprising:

an operating means for setting an operation mode of the copying function;

a first time counting means for counting a first inhibition time after the end of operation of the operating means;

a second time counting means for counting a second inhibition time different from the first inhibition time after the end of a print operation by the copying function; and an inhibiting means for inhibiting print operation by the automatic printing function during counting either the first inhibition time or the second inhibition time.

8. An image forming apparatus as claimed in claim 7, wherein said second inhibition time is shorter than said first inhibition time.

9. An image forming apparatus as claimed in claim 7, wherein the automatic printing function is a function for automatically printing an image transmitted from another facsimile.

10. An image forming apparatus as claimed in claim 7, wherein the printing function is a function for automatically printing an image transmitted from an external computer.

11. An image forming apparatus having a copying function for reading an original image and executing printing and an automatic printing function for automatically printing an image received externally, comprising:

an automatic document feeder unit for successively conveying original sheets in a stack set on an original tray to a read position;

a first time counting means for counting a first inhibition time after the end of a print operation of an original set manually by the copying function;

a second time counting means for counting a second inhibition time different from the first inhibition time after the end of a print operation of an original set by the automatic document feeder unit by the copying function; and an inhibiting means for inhibiting print operation by the automatic printing function during counting either the first inhibition time or the second inhibition time.

12. An image forming apparatus as claimed in claim 11, wherein said second inhibition time is shorter than said first inhibition time.

13. An image forming apparatus as claimed in claim 11, further comprising:

an operating means for setting an operation mode of the copying function; and a third time counting means for counting a third inhibition time longer than the first inhibition time after the end of operation of the operating means, the inhibiting means inhibiting the print operation by the automatic printing function during counting the third inhibition time.

14. An image forming apparatus having an auto-clear function for automatically setting an operation mode back to an initial mode when no operation is executed for a specified time, comprising:

a changing means capable of changing an auto-clear operating time until the auto-clear effect after the end of a print operation or after the execution of last operation, the changing means setting the auto-clear operating time after the end of the print operation shorter than the auto-clear operating time after the execution of the last operation.

15. An image forming apparatus having an auto-clear function for automatically setting an operation mode back to an initial mode when no operation is executed for a specified time, comprising:

an original conveying means for automatically successively conveying original sheets in a stack set on an original tray to a read position; and a changing means capable of changing an auto-clear operating time until the auto-clear effect after the end of a print operation or after the execution of last operation, the changing means setting the auto-clear operating time after the end of the print operation when the original is automatically set in the original read position by the original conveying means shorter than the auto-clear operating time after the end of the print operation when the original is manually set in the original read position.

* * * * *